(12) United States Patent
Hu et al.

(10) Patent No.: US 11,063,523 B2
(45) Date of Patent: Jul. 13, 2021

(54) DC/DC CONVERTER AND CONTROL METHOD THEREOF

(71) Applicant: Delta Electronics (Shanghai) CO., LTD, Shanghai (CN)

(72) Inventors: Wenfei Hu, Shanghai (CN); Cheng Lu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 16/739,700

(22) Filed: Jan. 10, 2020

(65) Prior Publication Data

US 2020/0228022 A1  Jul. 16, 2020

(30) Foreign Application Priority Data

Jan. 16, 2019  (CN) .......................... 201910040983.4

(51) Int. Cl.
*H02M 3/335* (2006.01)
*H02M 1/088* (2006.01)
*H02M 1/00* (2006.01)

(52) U.S. Cl.
CPC ....... *H02M 3/33584* (2013.01); *H02M 1/088* (2013.01); *H02M 1/0035* (2021.05); *H02M 1/0058* (2021.05)

(58) Field of Classification Search
CPC ............... H02M 1/15; H02M 3/33584; H02M 2001/0035; H02M 7/487; H02M 2001/0058
See application file for complete search history.

(56) References Cited

U.S. PATENT DOCUMENTS 6,349,044 B1   2/2002 Canales-Abarca et al.
6,353,547 B1   3/2002 Jang et al.
(Continued)

FOREIGN PATENT DOCUMENTS

CN   101267160 A   9/2008
CN   102025162 A   4/2011
(Continued)

OTHER PUBLICATIONS

Lee Jun-Young et al: "Three level NPC dual active bridge capacitor voltage balancing switching modulation",2017 IEEE International Telecommunications Energy Conference (INTELEC), IEEE, Oct. 22, 2017 (Oct. 22, 2017) , pp. 438-443.
(Continued)

*Primary Examiner* — Yusef A Ahmed
(74) *Attorney, Agent, or Firm* — Qinghong Xu

(57) ABSTRACT

A DC/DC converter includes: a first capacitor and a second capacitor coupled to a first node; a five-port network coupled to the first to fifth nodes; a transformer electrically connected to the fourth and fifth nodes; and a secondary side circuit electrically connected to a secondary winding of the transformer and coupled to a load; the control method includes: controlling, when the load is less than a preset value, switching states of multiple switches in the secondary side circuit, causing the transformer to be short-circuited for at least a first time period during a phase of stopping energy transmission; and controlling switching states of multiple switches in the five-port network during the first time period, causing current to flow from the five-port network to the first node or flow from the first node to the five-port network.

14 Claims, 19 Drawing Sheets

(56) References Cited

U.S. PATENT DOCUMENTS

| | | | |
|---|---|---|---|
| 6,370,050 B1 | 4/2002 | Peng et al. | |
| 6,442,047 B1 | 8/2002 | Cohen | |
| 7,638,904 B2 | 12/2009 | Shoji et al. | |
| 8,779,700 B1 | 7/2014 | Prodic et al. | |
| 9,214,868 B2 | 12/2015 | Jin et al. | |
| 9,667,157 B1 | 5/2017 | Dong et al. | |
| 9,748,855 B2 | 8/2017 | Lee | |
| 10,177,681 B2 | 1/2019 | Neumayr et al. | |
| 10,673,343 B1* | 6/2020 | Tong | H02M 3/33584 |
| 2002/0191422 A1* | 12/2002 | Takagi | H02M 3/33592 363/21.06 |
| 2012/0153729 A1 | 6/2012 | Chae et al. | |
| 2012/0163035 A1 | 6/2012 | Chae et al. | |
| 2013/0272032 A1 | 10/2013 | Mueller et al. | |
| 2014/0035541 A1 | 2/2014 | Jin et al. | |
| 2014/0140104 A1 | 5/2014 | Norrga et al. | |
| 2014/0146572 A1* | 5/2014 | Ye | H02M 3/337 363/17 |
| 2014/0157015 A1 | 6/2014 | Yang et al. | |
| 2014/0198536 A1* | 7/2014 | Fu | H02M 3/33546 363/17 |
| 2014/0368167 A1* | 12/2014 | Okura | B60L 53/20 320/109 |
| 2015/0023063 A1 | 1/2015 | Perreault et al. | |
| 2015/0078053 A1* | 3/2015 | Harrison | H02M 7/53871 363/132 |
| 2015/0131330 A1 | 5/2015 | Pan et al. | |
| 2015/0207424 A1 | 7/2015 | Okamoto et al. | |
| 2015/0229225 A1 | 8/2015 | Jang et al. | |
| 2015/0249394 A1* | 9/2015 | Liu | H02M 3/285 363/21.02 |
| 2015/0263631 A1* | 9/2015 | Matsuura | H02M 3/33576 363/21.02 |
| 2015/0288284 A1* | 10/2015 | Lavieville | H02M 7/487 363/34 |
| 2016/0020702 A1* | 1/2016 | Trescases | H02M 3/33592 363/17 |
| 2016/0099646 A1 | 4/2016 | Safaee et al. | |
| 2016/0149502 A1 | 5/2016 | Kidera et al. | |
| 2016/0294294 A1* | 10/2016 | Ye | H02M 3/33592 |
| 2016/0344297 A1 | 11/2016 | Lee | |
| 2017/0005589 A1 | 1/2017 | Moreno Munoz et al. | |
| 2017/0358996 A1 | 12/2017 | Higaki et al. | |
| 2017/0370977 A1* | 12/2017 | El-Barbari | G01R 27/2611 |
| 2018/0034359 A1* | 2/2018 | Chen | H02M 3/33592 |
| 2018/0048240 A1* | 2/2018 | Hayasaki | H02M 3/3376 |
| 2018/0152097 A1* | 5/2018 | Ying | H02M 1/32 |
| 2018/0169781 A1* | 6/2018 | Ikejiri | H02M 7/5387 |
| 2018/0183345 A1 | 6/2018 | Itoh et al. | |
| 2018/0262117 A1* | 9/2018 | Lu | H02M 7/797 |
| 2018/0294732 A1* | 10/2018 | Ye | H02M 3/337 |
| 2018/0301989 A1 | 10/2018 | Yamagami et al. | |
| 2018/0331625 A1* | 11/2018 | Somani | H02M 3/1582 |
| 2018/0367051 A1 | 12/2018 | Agamy et al. | |
| 2019/0020271 A1* | 1/2019 | Fu | H02M 7/487 |
| 2019/0052177 A1* | 2/2019 | Lu | H02M 7/5387 |
| 2019/0173387 A1* | 6/2019 | Tanaka | H02M 1/08 |
| 2019/0288606 A1 | 9/2019 | Higaki et al. | |
| 2020/0083727 A1* | 3/2020 | Sun | H02M 1/10 |
| 2020/0144926 A1 | 5/2020 | Murakami | |
| 2020/0186046 A1* | 6/2020 | Tanaka | H02M 1/08 |
| 2020/0212816 A1 | 7/2020 | Sun et al. | |
| 2020/0220466 A1* | 7/2020 | Backman | H02J 9/062 |
| 2020/0228017 A1* | 7/2020 | Hu | H02M 3/33523 |
| 2021/0050769 A1 | 2/2021 | Xia et al. | |
| 2021/0058004 A1 | 2/2021 | Maki et al. | |

FOREIGN PATENT DOCUMENTS

| | | |
|---|---|---|
| CN | 201821269 U | 5/2011 |
| CN | 102299649 A | 12/2011 |
| CN | 202444423 U | 9/2012 |
| CN | 103701325 A | 4/2014 |
| CN | 105356758 A | 2/2016 |
| CN | 108471238 A | 8/2018 |
| EP | 3086625 A2 | 10/2016 |

OTHER PUBLICATIONS

Filba-Martinez Alber et al: "Operating Principle and Performance Optimization of a Three-Level NPC Dual-Active-Bridge DC-DC Converter", IEEE Transactions on Inoustrial Electronics, IEEE Service Center, Piscataway, NJ, USA,vol. 63, No. 2, Feb. 1, 2016 (Feb. 1, 2016), pp. 678-690.

The EESR issued Jun. 17, 2020,from application No. 20152039.2.

The EESR issued Jun. 19, 2020,from application No. 20152059.0.

Gedeon Niyitegeka etc."Phase Shift Modulation and DC-Link's Voltage Balancing Control for a DAB DC-DC Converter".

Wei Liu etc."An Interleaved PWM Method With Better Voltage-Balancing Ability for Half-Bridge Three-Level DC/DC Converter".

The CN1OA dated Nov. 10, 2020 by the CNIPA from application No. 2019100409834.

The CN1OA dated Nov. 20, 2020 by the CNIPA from application No. 201910040952.9.

Non-Final Rejection dated Apr. 28, 2021 form U.S. Appl. No. 16/739,769.

* cited by examiner

US 11,063,523 B2

1

DC/DC CONVERTER AND CONTROL METHOD THEREOF

CROSS REFERENCE

The present application claims priority to Chinese Patent Application No. 201910040983.4, filed on Jan. 16, 2019, the entire contents of which are hereby incorporated by reference.

TECHNICAL FIELD

The present disclosure relates to the field of power supply technology, and in particular, to a control method of a DC/DC converter and the DC/DC converter as involved.

BACKGROUND

High-voltage DC/DC converters are widely used in high-power DC conversion systems, new energy storage systems, electric vehicle charging devices, rail transit power distribution systems, and the like. In order to reduce wire losses and costs, increase voltage levels, and reduce the number of cascade units, high-voltage DC/DC converter usually realizes high-voltage input by means of a three-level circuit. Affected by factors such as inconsistent hardware parameters, a neutral point potential of the three-level circuit may appear unbalanced, which affects the safety of the device and the normal operation of the converter. Thus, the neutral point potential must be subject to balance control.

It should be noted that the information disclosed in the background section above is only used to enhance the understanding of the background of the disclosure, and therefore may include information that does not constitute the prior art known to those of ordinary skill in the art.

SUMMARY

The present disclosure is directed to provide a control method of a DC/DC converter and the DC/DC converter as involved.

According to a first aspect of the disclosure, there is provided a control method of a DC/DC converter, applied to a DC/DC converter, the DC/DC converter including: a first capacitor and a second capacitor coupled to a first node, a second end of the first capacitor being coupled to a second node, and a second end of the second capacitor being coupled to a third node; a five-port network coupled to the first node, the second node, the third node, and further coupled to a fourth node and a fifth node; a transformer electrically connected to the fourth node and the fifth node; and a secondary side circuit electrically connected to a secondary winding of the transformer and coupled to a load; the control method includes:

controlling switching states of multiple switches in the secondary side circuit when the load is less than a preset value, causing the transformer to be short-circuited for at least a first time period during a phase of stopping energy transmission; and controlling switching states of multiple switches in the five-port network during the first time period, causing current to flow from the five-port network to the first node or flow from the first node to the five-port network, so as to reduce a voltage difference between the first capacitor and the second capacitor.

According to a second aspect of the disclosure, there is provided a DC/DC converter, including:

2 a first capacitor, having a first end coupled to a first node and a second end coupled to a second node;

a second capacitor, having a first end coupled to the first node and a second end coupled to a third node;

a five-port network, having a first end, a second end, a third end, a fourth end, and a fifth end respectively coupled to the first node, the second node, the third node, a fourth node, and a fifth node;

a transformer, having a primary winding electrically connected to the fourth node and the fifth node;

a secondary side circuit, electrically connected to a secondary winding of the transformer and coupled to a load; and a processor, coupled to the five-port network and the secondary side circuit and configured to control, when a load is less than a preset value, switching states of multiple switches in the secondary side circuit, causing the transformer to be short-circuited for at least a first time period during a phase of stopping energy transmission; and control switching states of multiple switches in the five-port network during the first time period, causing current to flow from the five-port network to the first node or flow from the first node to the five-port network, so as to reduce a voltage difference between the first capacitor and the second capacitor.

It should be understood that the above general description and the following detailed description are merely exemplary and explanatory, and should not limit the present disclosure.

BRIEF DESCRIPTION OF THE DRAWINGS

The accompanying drawings herein are incorporated in and constitute a part of this specification, illustrate embodiments conforming to the present disclosure and together with the description serve to explain the principles of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
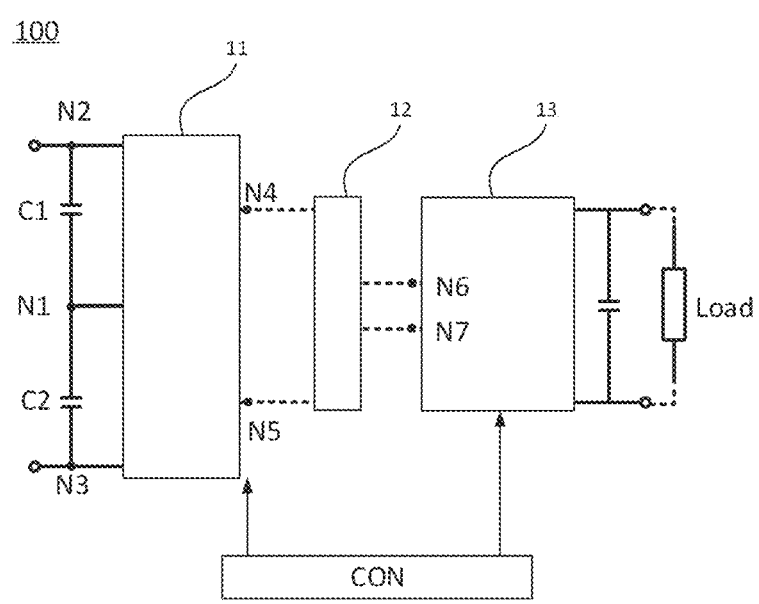
FIG. 1 is a schematic diagram illustrating a DC/DC converter using a three-level circuit.

Exemplary embodiments will be described more comprehensively by referring to accompanying drawings now. However, the exemplary embodiments can be embodied in many forms and should not be construed as limited to the embodiments set forth herein, rather, these embodiments are provided so that this disclosure will be made thorough and complete, and the concept of exemplary embodiments will be fully conveyed to those skilled in the art. Furthermore, the described features, structures, or characteristics may be combined in any suitable manner in one or more embodiments. In the following description, numerous specific details are provided to provide a thorough understanding of the embodiments of the present disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the present disclosure.

Furthermore, the accompanying drawings are merely schematic illustrations of the present disclosure. Same or similar parts are denoted by same reference numbers in the drawings and, thus, a detailed description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

In the related art, the neutral point balance is usually adjusted by regulating a current flowing through the neutral point, a magnitude of which depends on the load. When the load is too small, the current amplitude is too small for adjusting the neutral point potential.

In addition, the high-voltage DC/DC converter usually works in a burst mode under light load conditions to reduce the switching and conduction losses of the device and improve efficiency. The burst mode refers to a condition where the converter works intermittently at light load as follows. The converter is operating for a time period to transfer energy to the load and charge the output capacitor. After charging a certain amount of energy, the converter stops working, and the output capacitor provides the load power. When the output capacitor is discharged to a certain level, it will be charged by operating the converter, and so on. When the DC/DC converter using the three-level circuit with light load is operated in the burst mode, the balance control of the neutral point can be performed only when the switch is operated during the energy transfer phase. As the load becomes lighter, operation time of the converter is shortened and, thus, capability of adjusting the neutral point is weakened.

Therefore, in the existing working mode, the DC/DC converter using the three-level circuit has a problem of weak balance capability of neutral point under light load.

An embodiment of the present disclosure provides a control method of a DC/DC converter and the DC/DC converter as involved, for overcoming, at least to a certain extent, the problem of DC/DC converter using three-level circuit in existing working mode that the balance capability of neutral point is weak under light load, which is resulted from limitation and defects in related art.

A detailed description of the exemplary embodiments of the present disclosure will be made in the following with reference to the accompanying drawings.

FIG. 1 is a schematic diagram illustrating a DC/DC converter using a three-level circuit according to an embodiment of the disclosure.

Referring to FIG. 1, the DC/DC converter 100 may include:

a first capacitor C1, having a first end coupled to a first node N1, and a second end coupled to a second node N2;

a second capacitor C2, having a first end coupled to the first node N1, and a second end coupled to a third node N3;

a five-port network 11, having a first end, a second end, a third end, a fourth end, and a fifth end coupled to the first node N1, the second node N2, the third node N3, a fourth node N4, and a fifth node N5, respectively;

a transformer 12, having a primary winding electrically connected to the fourth node N4 and the fifth node N5;

a secondary side circuit 13, electrically connected to a secondary winding of the transformer 12 through a sixth node N6 and a seventh node N7, and coupled to a load (Load); and a processor CON, coupled to the five-port network 11 and the secondary side circuit 13 and is configured to control, when the load is less than a preset value, switching states of multiple switches in the secondary side circuit 13, causing the transformer 12 to be short-circuited for at least a first time period T1 during a phase of stopping energy transmission; and control switching states of multiple switches in the five-port network 11 during the first time period T1, causing current to flow from the five-port network 11 to the first node N1 or flow from the first node N1 to the five-port network 11, so as to reduce a voltage difference between the first capacitor C1 and the second capacitor C2.

Figure 2:
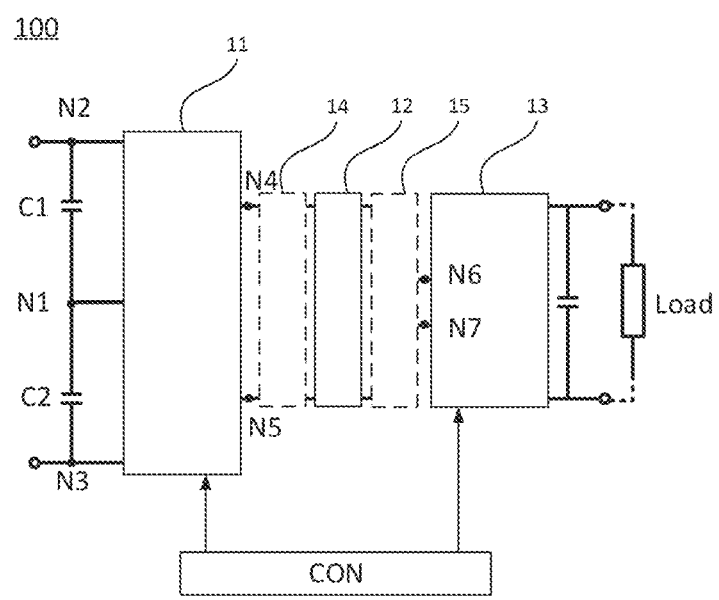
FIG. 2 is a schematic diagram illustrating an embodiment of the DC/DC converter shown in FIG. 1.

In some embodiments, the DC/DC converter 100 may further include one or more passive networks. As shown in FIG. 2, it may include only a first passive network 14 or only a second passive network 15, or include both the first passive network 14 and the second passive network 15. The first passive network 14 is coupled between the fourth node N4, the fifth node N5, and a primary winding of the transformer 2. The second passive network 15 is coupled between the secondary winding of the transformer 2 and the secondary side circuit 13 (coupled with the secondary side circuit 13 through the sixth node N6 and the seventh node N7).

There may be various forms of passive networks. For example, it may include only one or more capacitors, and may also include various combinations of capacitors and inductors connected in series, parallel, or series-parallel. The form and connection manner of each passive network are not limited by the disclosure, and may be configured by those skilled in the art according to the actual situation.

Figure 3:
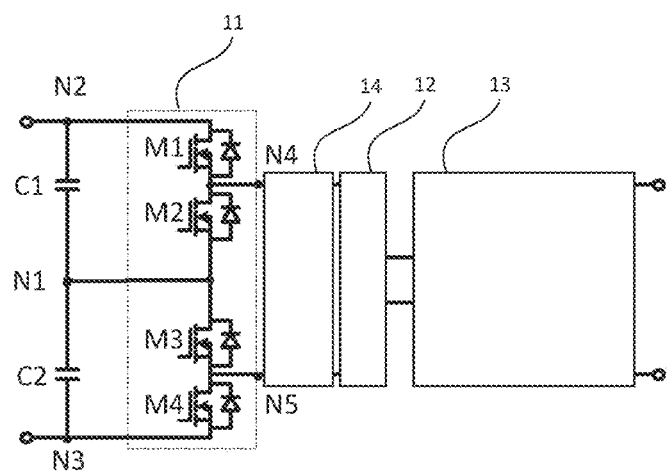
FIG. 3 is a schematic diagram illustrating an embodiment of the DC/DC converter shown in FIG. 1 with a five-port network 11 having a structure of series dual half-bridge.

FIG. 3 is a schematic diagram illustrating an embodiment of the DC/DC converter shown in FIG. 1.

In the embodiment shown in FIG. 3, the five-port network 11 may include:

a first bridge arm, coupled between the first node N1 and the second node N2 and including a first switch M1 and a second switch M2 connected in series; and a second bridge arm, coupled between the first node N1 and the third node N3, and including a third switch M3 and a fourth switch M4 connected in series.

In FIG. 3, the five-port network 11 includes two half bridges connected formed by four active devices connected in series, which may be referred to as a series dual half bridge (SHB) structure.

Figure 4:
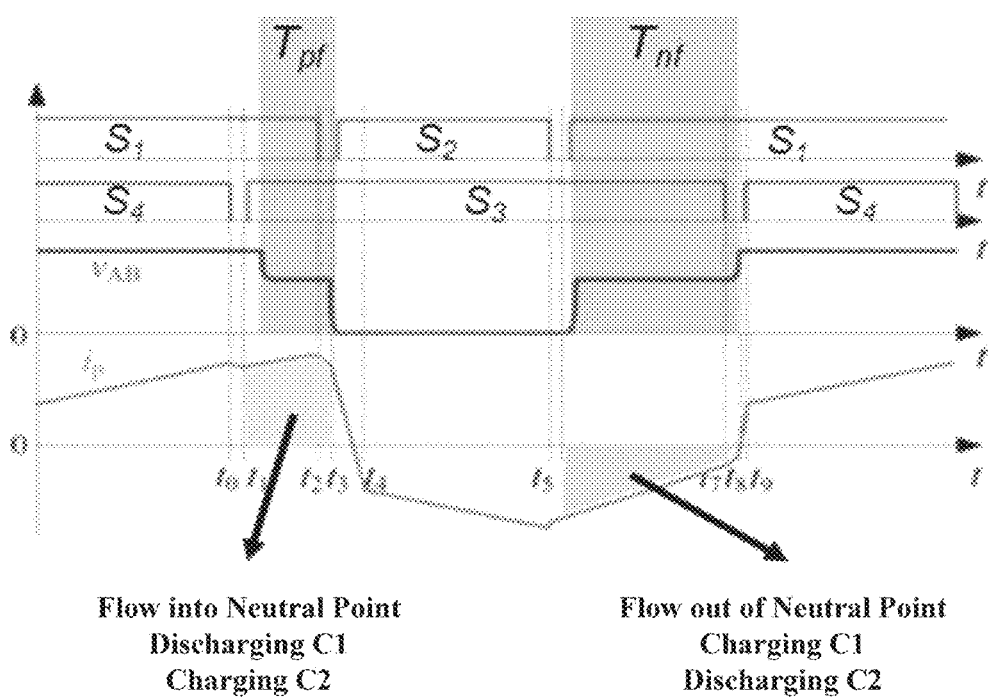
FIG. 4 is a schematic diagram illustrating a pulse width modulation waveform of the DC/DC converter shown in FIG. 3.

In order to solve the problem of neutral point balance in a three-level topology, magnitude of the current $i_N$ flowing into or out of the neutral point is regulated in related art by controlling action time of the middle level. Taking the structure shown in FIG. 3 as an example, a neutral point balancing method based on duty cycle modulation is proposed in related art, of which the control timing is shown in FIG. 4. In the period from t1 to t2 in FIG. 4, M1 and M3 are turned on to generate a middle level, causing the primary current of the transformer 12 to be positive, and the current flows into the neutral point (first node N1) through M3; during the period from t6 to t7, M1 and M3 are turned on to generate a middle level, causing the primary current of the transformer 12 to be negative, and the current flows out of the neutral point (first node N1) through M3. In a switching period, the middle-level state appears twice but has opposite effects on the neutral point, so that the neutral point balance can be controlled by adjusting a difference between action times of middle level in the positive and negative half period. For example, when $T_{pf} < T_{nf}$, the current flowing out of the neutral point is larger than the current flowing into the neutral point in one switching period, causing a voltage of the second capacitor C2 to decrease and a voltage of the first capacitor C1 to increase, thereby achieving regulation of the neutral point potential, and vice versa.

The regulation current is affected by the load in above manner. When the load is lower than a preset value, the regulation current may be too small in this manner, thereby limiting adjustment ability of the neutral point balance. Therefore, the present disclosure provides a DC/DC converter control method for neutral point balance adjustment of the DC/DC converter. When the load is less than the preset value, that is, under light load, switching states of multiple switches in the secondary side circuit 13 are controlled such that the transformer 12 is short-circuited for at least the first time period during the phase of stopping energy transmission, and the five-port network 11 is controlled in the first time period to generate a neutral point regulating current, thereby generating a larger neutral point regulating current through the short circuit of the secondary side circuit of the transformer and, thus, enhancing the neutral point balance adjustment capability of the circuit.

In some embodiments, the control method provided by the embodiment of the present disclosure may be applied in the three-level DC/DC circuit as shown in FIG. 1 or FIG. 3, which is operated in the burst mode under light load. Specifically, during the energy transmission phase of burst mode, the operation remains unchanged. During the stop phase of burst mode (that is, the phase of stopping the energy transmission), the transformer 12 is short-circuited for at least the first time period, and switches of the five-port network 11 are controlled to generate a relatively large short-circuit current, thereby causing the five-port network to inject current to or draw current from the neutral point (first node N1). As the transformer 12 is short-circuited in the first time period, no power flows into the output filter capacitor, and the converter is still in the phase of stopping energy transmission, the output voltage control will not be affected in this method of neutral point balance control.

In an embodiment, the DC/DC converter shown in FIG. 1 and FIG. 3 is a bidirectional conversion circuit, and the power may flow in a forward direction or in a reverse direction.

Figure 5:
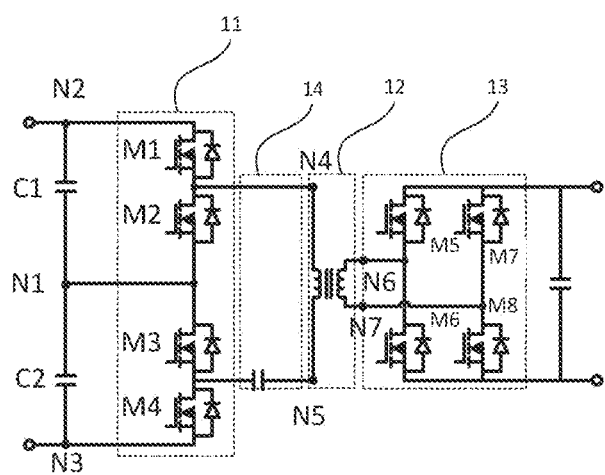
FIG. 5 is a schematic diagram illustrating a secondary-side circuit 13 according to an embodiment.
Figure 6A:
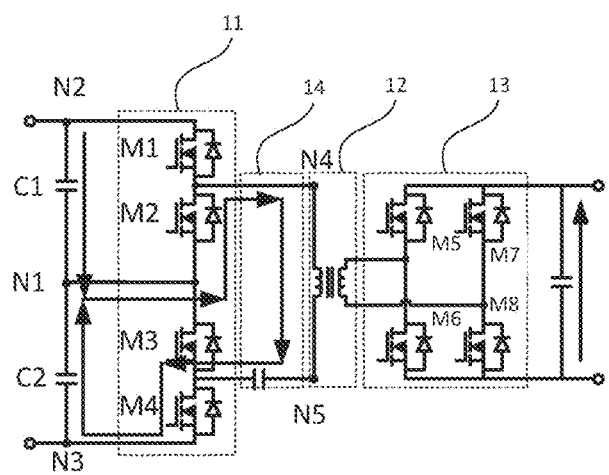
FIG. 6A-FIG. 6D are schematic diagrams illustrating a process of short-circuit and phase-shift control when the five-port network 11 has a structure of series dual half-bridge and the secondary side circuit has a structure of dual bridge arm.
Figure 6B:
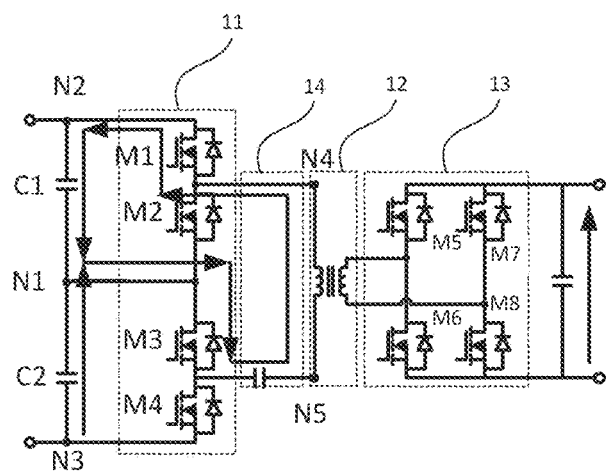
Figure 6C:
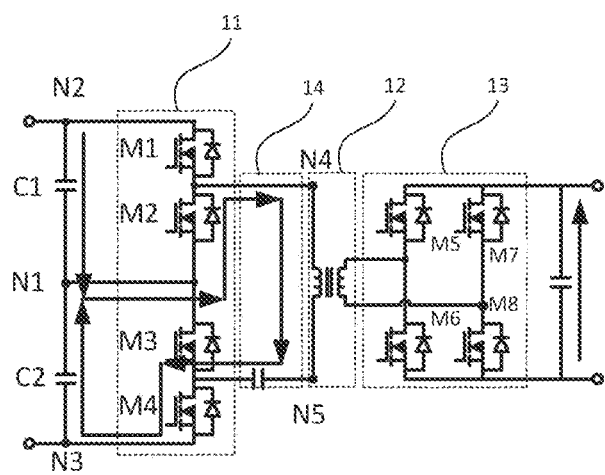
Figure 6D:
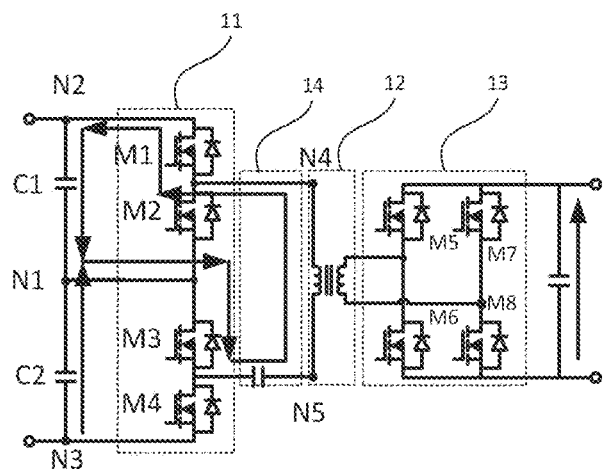

FIG. 5 is a schematic diagram illustrating a secondary-side circuit 13.

Referring to FIG. 5, the secondary-side circuit 13 may include:

a fourth bridge arm, including a fifth switch M5 and a sixth switch M6 coupled to the sixth node; and a fifth bridge arm, including a seventh switch M7 and an eighth switch M8 coupled to the seventh node.

The fifth switch M5 is coupled to the seventh switch M7, and the sixth switch M6 is coupled to the eighth switch M8.

In the embodiment shown in FIG. 5, it may be controlled during the first time period in a simultaneous manner that the fifth switch M5 and the seventh switch M7 are turned on and the sixth switch M6 and the eighth switch M8 are turned off, or it may be controlled during the first time period in a simultaneous manner that the sixth switch M6 and the eighth switch M8 are turned on and the fifth switch M5 and the seventh switch M7 are turned off, so as to short-circuit the transformer 12.

Taking the secondary side circuit 13 shown in FIG. 5 and the five-port network 11 having the series dual half-bridge (SHB) structure shown in FIG. 3 as an example, when the DC/DC converter operates in the stop phase of burst mode, the transformer 12 may be short-circuited by turning on the two upper switches or the two lower switches of the full bridge circuit at the same time, thereby causing the five-port network 11 to operate in a 1-level pattern. Accordingly, in combination with controlling the switches in the five-port network 11, the current of the primary side circuit, which is coupled with the primary winding of the transformer, is caused to flow from the first node N1 (neutral point) to the five-port network 11 or from the five-port network 11 to the first node N1. When the voltage on the first capacitor C1 is smaller than the voltage on the second capacitor C2, as shown in FIG. 6A to FIG. 6D, the secondary side circuit is controlled in cooperation with the control of the switches in the five-port network 11, causing the current of the primary side circuit, which is coupled with the primary winding of the transformer, to flow from the first node N1 (neutral point) to the five-port network 11, thereby increasing the voltage on the first capacitor C1 and decreasing the voltage on the second capacitor C2 and, thus, reducing the voltage difference between the first capacitor C1 and the second capacitor C2.

Figure 7:
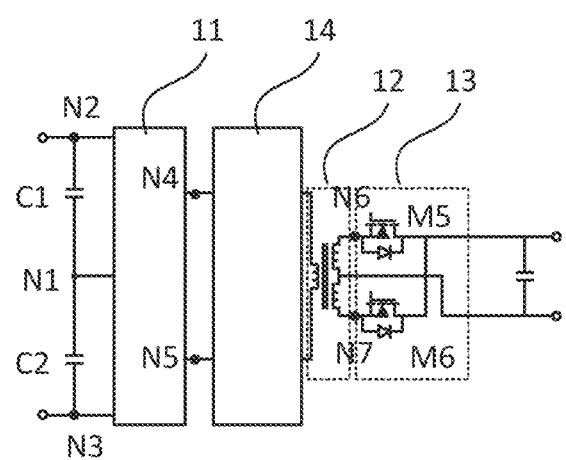
FIG. 7 is a schematic diagram illustrating a secondary-side circuit 13 according to another embodiment.

FIG. 7 is a schematic diagram illustrating another secondary side circuit 13.

Referring to FIG. 7, the secondary side circuit 13 may include:

a fifth switch M5, electrically connected to a first end of the secondary winding of the transformer 12 through the sixth node N6; and a sixth switch M6, coupled to the fifth switch M6 and electrically connected to a second end of the secondary winding of the transformer 12 through the seventh node N7.

Figure 8:
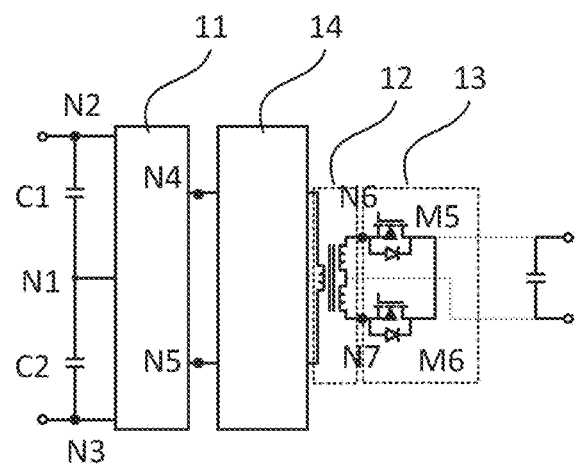
FIG. 8 is a schematic diagram illustrating a short circuit method of the secondary side circuit 13 shown in FIG. 7.

In the embodiment shown in FIG. 7, the secondary side circuit 13 is a full-wave rectification structure, in which the fifth switch M5 and the sixth switch M6 can be turned on at the same time to short-circuit the transformer 12. As shown in FIG. 8, when the secondary side circuit 13 shown in 7 is combined with the five-port network 11 of having the series dual half-bridge structure shown in FIG. 3, the five-port network 11 can be operated in the 1-level pattern, thereby, in combination with controlling the switches in the five-port network 11, causing the current of the primary side circuit, which is coupled with the primary winding of the transformer, to flow from the first node N1 (neutral point) to the five-port network 11 or from the five-port network 11 to the first node N1.

Figure 9:
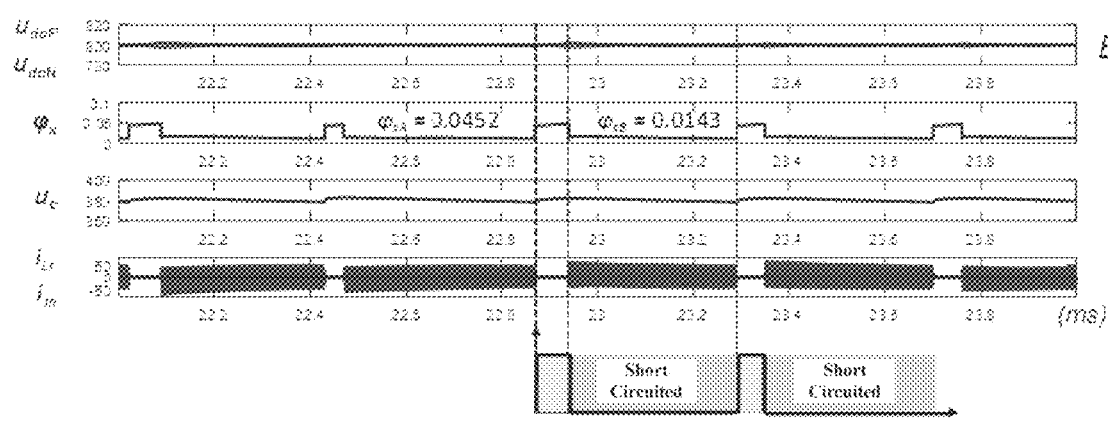
FIG. 9 is a simulation waveform diagram of the DC/DC converter.

FIG. 9 is a simulation waveform diagram illustrating waveforms of the DC/DC converters as shown in FIG. 6A to FIG. 6D or FIG. 8. Referring to FIG. 9, the DC/DC converter 100 operates in the burst mode, and the output voltage alternately rises and falls corresponding to the switching of starting and stopping energy transfer, and maintains a constant voltage as a whole. The resonance current of the primary side circuit, which is coupled to the primary winding of the transformer, is relatively small in amplitude during the energy transfer phase because the load is very light, and is relatively large in amplitude during the phase of stopping energy transmission due to the short circuit of the transformer 12 and, accordingly, the current flowing out of the neutral point is relatively large, thereby improving the capability for adjusting the neutral point balance.

Figure 10:
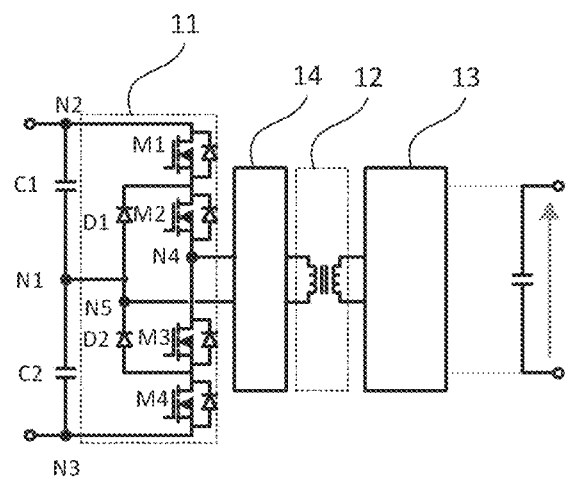
FIG. 10 is a schematic diagram illustrating a five-port network 11 having a diode clamping structure.

FIG. 10 is a schematic diagram illustrating another five-port network 11.

Referring to FIG. 10, in an embodiment, the five-port network 11 may also include:

a first bridge arm, coupled between the second node N2 and the fourth node N4, including a first switch M1 and a second switch M2 coupled to an eighth node N8;

a second bridge arm, coupled between the third node N3 and the fourth node N4, including a third switch M3 and a fourth switch M4 coupled to a ninth node N9; and a third bridge arm, coupled between the eighth node N8 and the ninth node N9, including a first diode D1 and a second diode D2 coupled to the fifth node N5.

The fifth node N5 is coupled to the first node N1.

The secondary side circuit 13 shown in FIG. 5 and FIG. 7 may also operate in cooperation with the five-port network 11 having the diode clamping structure shown in FIG. 10 to adjust the current flowing in or out of the first node N1, so as to decrease the voltage difference between C1 and C2.

In the embodiment of the present disclosure, when the secondary side circuit 13 is short-circuited, the method for controlling the five-port network 11, which causes the current to flow into or out of the first node N1, may include, for example, phase shift control or pulse width modulation. When the five-port network 11 is the series dual half-bridge structure shown in FIG. 3, the phase shift control or pulse width modulation may be applied on the five-port network 11; when the five-port network is the diode clamping structure shown in FIG. 10, the pulse width modulation may be applied on the five-port network 11.

Figure 11:
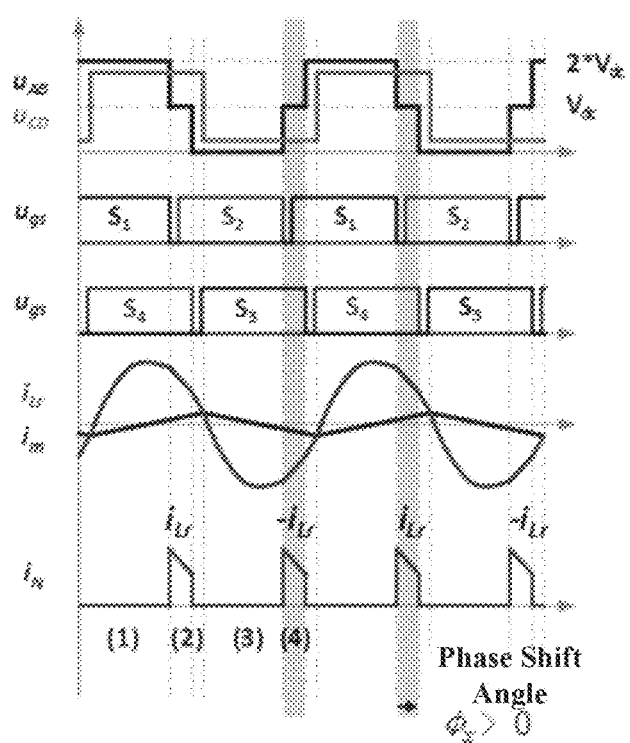
FIG. 11 is a waveform diagram of the phase shift control.

FIG. 11 is a waveform diagram of the phase shift control.

In FIG. 11, S1 to S4 refer to gate control signals of the first to fourth switches M1 to M4, respectively.

Referring to FIG. 11, when the five-port network 11 has the series dual half-bridge structure shown in FIG. 2, during the short circuit of the transformer (that is, within the first time period), control may be implemented in such a manner that the first switch M1 and the second switch M2 are turned on in a complementary manner, the third switch M3 and the fourth switch M4 are turned on in a complementary manner, a first preset phase exists between turning-on time of the first switch M1 and turning-on time of the fourth switch M4, and the first preset phase exists between turning-on time of the second switch M2 and turning-on time of the third switch M3. The first preset phase is adjusted to reduce the voltage difference between the first capacitor C1 and the second capacitor C2.

FIG. 4 is also a waveform diagram of the pulse width modulation when the five-port network 11 has the serial dual half-bridge structure shown in FIG. 3.

Referring to FIG. 4, when the pulse width modulation is performed on the five-port network 11, control may be implemented in such a manner that the first switch M1 and the second switch M2 are turned on in a complementary manner, the third switch M3 and the fourth switch M4 are turned on in a complementary manner, and in a switching period, turning-on time of the first switch M1 is greater than turning-on time of the second switch M2, turning-on time of the third switch M3 is greater than turning-on time of the fourth switch M4, and the turning-on time of the first switch M overlaps with the turning-on time of the third switch M3 in at least a second time period. Alternatively, in the switching period, the turning-on time of the first switch M1 is less than the turning-on time of the second switch M2, the turning-on time of the third switch M3 is less than the turning-on time of the fourth switch M4, and the turning-on time of the second switch M2 overlaps with the turning-on time of the fourth switch M4 in at least the second time period. The second time period is adjusted to reduce the voltage difference between the first capacitor C1 and the second capacitor C2. It can be seen from FIG. 3 that the second time period may be divided into two parts, $T_{pf}$ and $T_{nf}$.

Figure 12:
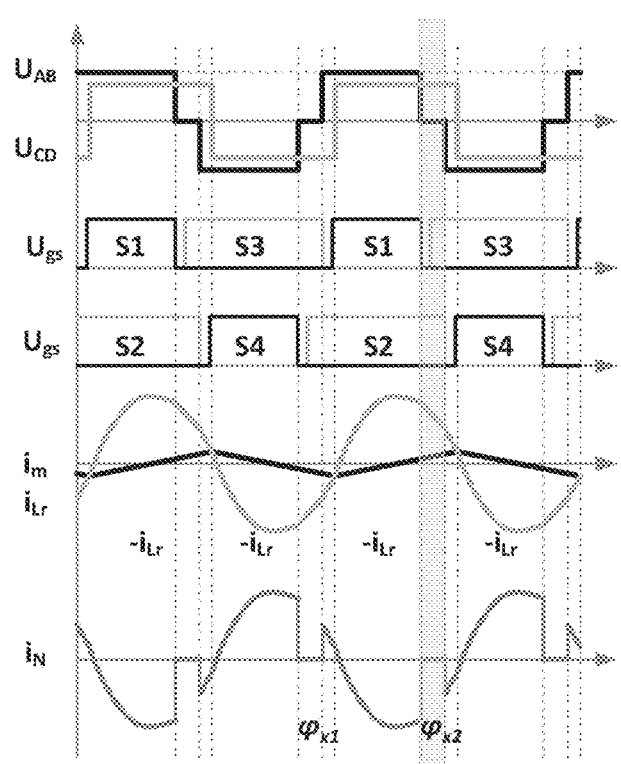
FIG. 12 is a waveform diagram of pulse width modulation when the five-port network 11 has the diode clamping structure.

FIG. 12 is a waveform diagram of the pulse width modulation when the five-port network 11 has the diode clamping structure shown in FIG. 10.

For the diode neutral point clamping circuit, conduction states of control signals are in such a manner that the control signal S1 of the first switch M1 and the control signal S3 of the third switch M3 are complementary with each other, the control signal S2 of the second switch M2 and the control signal S4 of the fourth switch M4 are complementary with each other, and the turning-on time of S2 and S3 is longer than that of S1 and S4. Due to the different topological structure, the control scheme of the switches in the pulse width modulation of the diode clamping structure is not exact the same as that in the pulse width modulation of the series dual half-bridge structure and, substantially, is performed by adjusting difference between action time of high levels (1 and −1) in positive and negative half period to control the neutral point balance.

The circuit diagrams of the five-port network and the corresponding modulation methods as described above are merely exemplary. The structure of the five-port network and corresponding control method may be configured by those skilled in the art on the basis of applying the method for controlling the secondary side circuit according to the present disclosure, so as to control the primary side current of transformer to flow in or out of the first node N1 and, further, reduce the voltage difference between C1 and C2, thereby achieving the neutral point balance of the DC/DC converter.

Although a relatively large primary side current can be generated for neutral point balance control through the short circuit of the transformer, compared with the operation mode in which all the switches are turned off during the phase of stopping energy transfer, turn-off loss of the switches of the primary side circuit of the transformer (i.e., the five-port network 11) is severe with large current, and turn-on loss is also large, which seriously affects the efficiency under light load.

Since the neutral point adjustment capability of the circuit is extremely strong when the transformer is short-circuited during the phase of stopping energy transmission in burst mode under a work condition of light load, the short-circuit balancing strategy may be performed intermittently according to imbalance condition of the neutral point, so as to reduce energy loss, thereby achieving balance between improvement of neutral point regulation capability and reduction of light load loss. Specifically, in an embodiment of the present disclosure, the transformer 12 may be short-circuited for at least a first time period during the phase of stopping energy transmission in the burst mode of DC/DC converter when the load is less than a preset value. The first time period may be within one burst period of the burst mode, and may be determined by performing hysteresis control or proportional integral control according to a voltage difference between the first capacitor C1 and the second capacitor C2.

Figure 13:
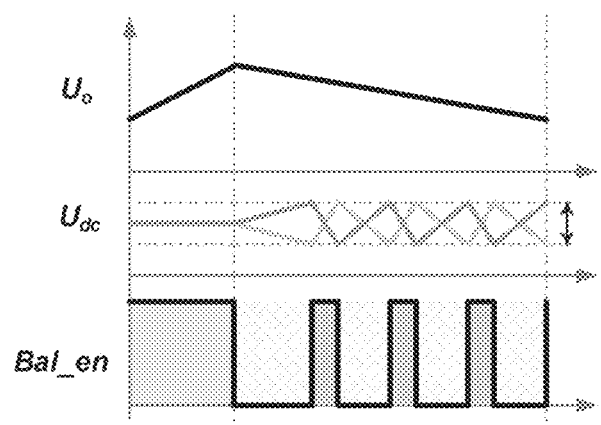
FIG. 13 is a waveform diagram of a short circuit method in burst mode of the secondary side circuit 13.

FIG. 13 is a waveform diagram of applying intermittent short-circuit on the secondary side circuit according to an embodiment of the present disclosure.

Referring to FIG. 13, under the light load condition, the transformer 12 is intermittently short-circuited during the phase of stopping energy transfer in burst mode, such that the current is controlled to flow in or out of the first node N1, thereby maintaining the voltage balance at the neutral point of the capacitor bridge arm (reducing the voltage difference between C1 and C2). In the embodiment shown in FIG. 12, the control method of the five-port network 11 is not limited, and the short-circuit method of the secondary circuit 13 is not limited. In the intermittent adjustment under short-circuit mode, hysteresis control may be performed based on the voltage difference between the two input capacitors; alternatively, duty cycle adjustment may be performed based on output of a P1 regulator.

Figure 14A:
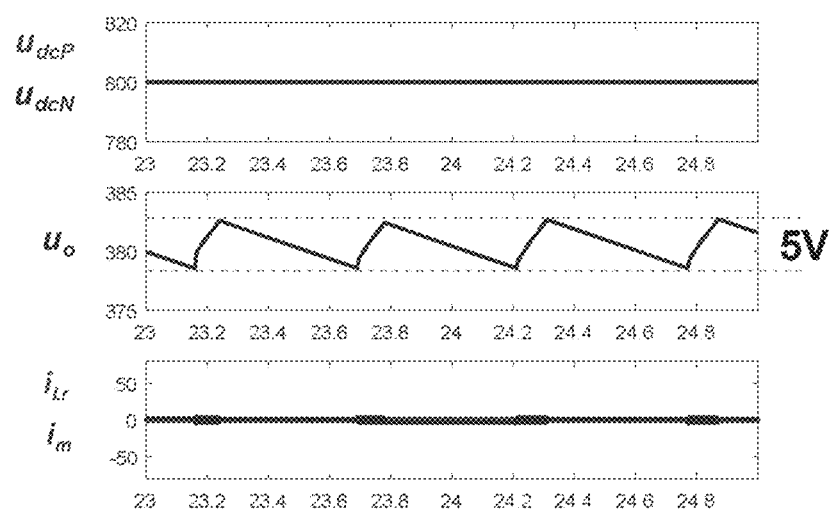
FIG. 14A is a simulation waveform when the neutral point balance control is implemented using an external circuit.

FIG. 14A is a simulation waveform when the neutral point balance control is implemented using an external circuit.

Figure 14B:
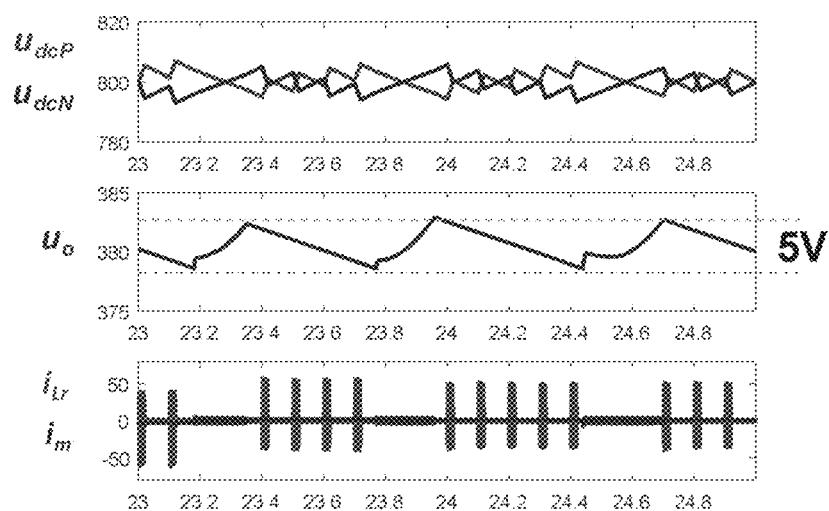
FIG. 14B is a simulation waveform when the load is 0.25% using intermittent short circuit method.

FIG. 14B is a simulation waveform of intermittent short-circuit regulation under a load of 0.25%, which realizes output voltage regulation control and neutral point potential balance control. Compared with FIG. 14A, the output voltage ripple is substantially the same, which verifies that the neutral point balance control does not affect the output voltage.

In an embodiment, a preceding stage of the DC/DC converter 100 includes an AC/DC converter 200, and the DC/DC converter 100 is coupled with the AC/DC converter 200 through the first node N1, the second node N2, and the third node N3.

Figure 15:
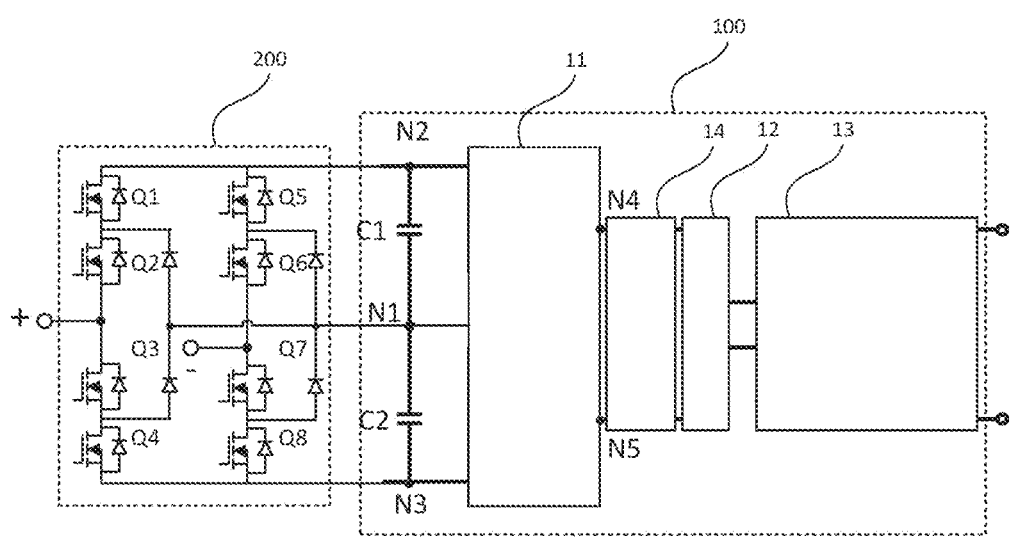
FIG. 15 is a schematic diagram illustrating an AC/DC converter coupled to the DC/DC converter.

As shown in FIG. 15, the AC/DC converter 200 generally includes a three-level topology with two diode neutral point clamping (DNPC) bridge arms, in which the neutral point potential may also be adjusted by the AC/DC converter 200.

Taking the DNPC three-level circuit structure in FIG. 15 as an example, for a single DNPC bridge arm (Q1, Q2, Q3, Q4 or Q5, Q6, Q7, Q8), three levels of +1, 0 (zero), −1 can be generated. When working at the zero level, a grid-side current can be connected to the neutral point N1 through the two inner switches. Therefore, the neutral point balance can be adjusted by adjusting the action time of the zero level, and a direction of modulation wave can be determined by positive or negative polarity of the modulation wave as well as the direction of current.

As the AC/DC converter 200 has a very small grid current under light load, which is not enough to provide sufficient neutral point current, it is typically necessary to inject reactive current to increase magnitude of the grid current to improve controlling capability of the neutral point balance, and respectively regulate modulation waves of the two bridge arms to achieve neutral point potential balance (reduce the voltage difference between the first capacitor and the second capacitor). This neutral point control method may have an impact on quality of the power grid, and the injection of a large amount of reactive current may also increase the conduction loss and switching loss of the AC/DC converter 200.

Therefore, in an embodiment of the present disclosure, the neutral point balance under light load of the circuit shown in FIG. 15 is achieved by controlling the DC/DC converter 100 to be short-circuited for at least a first time period during the phase of stopping energy transmission, that is, controlling the currents flowing in and out of the first node N1 to reduce the voltage difference between C1 and C2. The currents flowing in and out of the first node N1 in the DC/DC converter 100 may be controlled through any embodiment of the aforementioned methods, so as to reduce the voltage difference between C1 and C2, thereby controlling the neutral point balance of the circuit shown in FIG. 15. Detailed description of the control method will be not repeated here.

It is to be noted that, in the above embodiments, the control method of the DC/DC converter provided by the embodiments of the present disclosure may alternate with a control method of the circuit when the load is greater than the preset value, thereby forming a certain control period. In actual working process, the control method may also be triggered by imbalance of the capacitor bridge arm, which does not form a certain control period with the control method of the circuit during normal operation, and is even independent of the load condition.

In summary, according to the embodiments of the present disclosure, the adjustment capability of neutral point of the circuit can be improved, when the load is lower than a preset value (e.g., under light load), by short-circuiting the transformer, cause the five-port network at the primary side to operate to achieve the neutral point balance of the capacitor bridge arm. In addition, through the intermittent short-circuit adjustment, both the neutral point balance and light-load efficiency can be taken into account. The method has a wide range of application, for example, can be applied to various DC/DC circuits (resonant or non-resonant, unidirectional or bidirectional) in which the primary side circuit coupled to the primary winding of the transformer is the three-level structure.

It should be noted that although several modules or units of the device for action execution are mentioned in the detailed description above, this division is not mandatory. In fact, according to the embodiments of the present disclosure, the features and functions of two or more modules or units described above may be embodied in one module or unit. Similarly, the features and functions of a module or unit described above can be further divided into multiple modules or units to be embodied.

In addition, the above-mentioned drawings are merely a schematic description of processes included in a method according to an exemplary embodiment of the present invention, and are not limiting purposes. It is easy to understand that the processes shown in the above drawings do not indicate or limit the chronological order of these processes. In addition, it is also easy to understand that these processes may be performed synchronously or asynchronously in multiple modules, for example.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the claims.

What is claimed is:

1. A control method of a DC/DC converter, the DC/DC converter comprising: a first capacitor and a second capacitor coupled to a first node, a second end of the first capacitor being coupled to a second node, and a second end of the second capacitor being coupled to a third node; a five-port network coupled to the first node, the second node, the third node, and further coupled to a fourth node and a fifth node; a transformer electrically connected to the fourth node and the fifth node; and a secondary side circuit electrically connected to a secondary winding of the transformer and coupled to a load; characterized in that the control method comprises:
controlling switching states of multiple switches in the secondary side circuit when the load is less than a preset value, causing the transformer to be short-circuited for at least a first time period during a phase of stopping energy transmission; and
controlling switching states of multiple switches in the five-port network during the first time period, causing current to flow from the five-port network to the first node or flow from the first node to the five-port network, so as to reduce a voltage difference between the first capacitor and the second capacitor,
wherein the five-port network comprises: a first bridge arm coupled between the first node and the second node, and a second bridge arm coupled between the first node and the third node, the first bridge arm comprising a first switch and a second switch connected in series, the second bridge arm comprising a third switch and a fourth switch connected in series, and
wherein the controlling switching states of multiple switches in the five-port network during the first time period, causing current to flow from the five-port network to the first node or flow from the first node to the five-port network, so as to reduce a voltage difference between the first capacitor and the second capacitor comprises:
controlling in such a manner during the first time period that the first switch and the second switch are in complementary conduction, the third switch and the fourth switch are in complementary conduction, a first preset phase exists between turning-on time of the first switch and turning-on time of the fourth switch, and the first preset phase exists between turning-on time of the second switch and turning-on time of the third switch; and
adjusting the first preset phase to control a flow direction of the current, so as to reduce the voltage difference between the first capacitor and the second capacitor.

2. The control method according to claim 1, wherein the secondary side circuit comprises a fourth bridge arm and a fifth bridge arm, the fourth bridge arm comprising a fifth switch and a sixth switch coupled to a sixth node, the fifth bridge arm comprising a seventh switch and an eighth switch coupled to a seventh node, the fifth switch being coupled to the seventh switch, the sixth switch being coupled to the eighth switch, the sixth node and the seventh node being electrically connected to the secondary winding of the transformer; and the controlling switching states of multiple switches in the secondary side circuit, causing the transformer to be short-circuited for at least a first time period during a phase of stopping energy transmission comprises:
simultaneously controlling the fifth switch and the seventh switch to be turned on and the sixth switch and the eighth switch to be turned off during the first time period; or
simultaneously controlling the sixth switch and the eighth switch to be turned on and the fifth switch and the seventh switch to be turned off during the first time period.

3. The control method according to claim 1, wherein the secondary side circuit comprises a fifth switch and a sixth switch being coupled to each other, the fifth switch being electrically connected to a first end of the secondary winding of the transformer through a sixth node, the sixth switch being electrically connected to a second end of the secondary winding of the transformer through a seventh node; and the controlling switching states of multiple switches in the secondary side circuit, causing the transformer to be short-circuited for at least a first time period during a phase of stopping energy transmission comprises:
simultaneously controlling the fifth switch and the sixth switch to be turned on during the first time period.

4. The control method according to claim 1, further comprising:
controlling, when the load is less than the preset value, the DC/DC converter to operate in a burst mode, wherein the first time period is within a burst period.

5. A control method of a DC/DC converter, the DC/DC converter comprising: a first capacitor and a second capacitor coupled to a first node, a second end of the first capacitor being coupled to a second node, and a second end of the second capacitor being coupled to a third node; a five-port network coupled to the first node, the second node, the third node, and further coupled to a fourth node and a fifth node; a transformer electrically connected to the fourth node and the fifth node; and a secondary side circuit electrically connected to a secondary winding of the transformer and coupled to a load; characterized in that the control method comprises:
controlling switching states of multiple switches in the secondary side circuit when the load is less than a preset value, causing the transformer to be short-circuited for at least a first time period during a phase of stopping energy transmission; and
controlling switching states of multiple switches in the five-port network during the first time period, causing current to flow from the five-port network to the first node or flow from the first node to the five-port network, so as to reduce a voltage difference between the first capacitor and the second capacitor,
wherein the five-port network comprises: a first bridge arm coupled between the first node and the second node, and a second bridge arm coupled between the first node and the third node, the first bridge arm comprising a first switch and a second switch connected in series, the second bridge arm comprising a third switch and a fourth switch connected in series, and wherein the controlling switching states of multiple switches in the five-port network during the first time period, causing current to flow from the five-port network to the first node or flow from the first node to the five-port network, so as to reduce a voltage difference between the first capacitor and the second capacitor comprises:

controlling in such a manner during the first time period that the first switch and the second switch are in complementary conduction, the third switch and the fourth switch are in complementary conduction, and in a switching period, turning-on time of the first switch is greater than turning-on time of the second switch, turning-on time of the third switch is greater than turning-on time of the fourth switch, and the turning-on time of the first switch overlaps with the turning-on time of the third switch in at least a second time period, or in the switching period, the turning-on time of the first switch is less than the turning-on time of the second switch, the turning-on time of the third switch is less than the turning-on time of the fourth switch, and the turning-on time of the second switch overlaps with the turning-on time of the fourth switch in at least the second time period; and adjusting the second time period to reduce the voltage difference between the first capacitor and the second capacitor.

6. A control method of a DC/DC converter, the DC/DC converter comprising: a first capacitor and a second capacitor coupled to a first node, a second end of the first capacitor being coupled to a second node, and a second end of the second capacitor being coupled to a third node; a five-port network coupled to the first node, the second node, the third node, and further coupled to a fourth node and a fifth node; a transformer electrically connected to the fourth node and the fifth node; and a secondary side circuit electrically connected to a secondary winding of the transformer and coupled to a load; characterized in that the control method comprises:

controlling switching states of multiple switches in the secondary side circuit when the load is less than a preset value, causing the transformer to be short-circuited for at least a first time period during a phase of stopping energy transmission; and controlling switching states of multiple switches in the five-port network during the first time period, causing current to flow from the five-port network to the first node or flow from the first node to the five-port network, so as to reduce a voltage difference between the first capacitor and the second capacitor, wherein the five-port network comprises: a first bridge arm coupled between the second node and the fourth node, a second bridge arm coupled between the third node and the fourth node, and a third bridge arm coupled between a midpoint of the first bridge arm and a midpoint of the second bridge arm, the first bridge arm comprising a first switch and a second switch coupled to the midpoint of the first bridge arm, the second bridge arm comprising a third switch and a fourth switch coupled to the midpoint of the second bridge arm, the third bridge arm comprising a first diode and a second diode coupled to the fifth node, the fifth node being coupled to the first node, and wherein the controlling switching states of multiple switches in the five-port network during the first time period, causing current to flow from the five-port network to the first node or flow from the first node to the five-port network, so as to reduce a voltage difference between the first capacitor and the second capacitor comprises:

controlling in such a manner that the first switch and the third switch are in complementary conduction, the second switch and the fourth switch are in complementary conduction, and in a switching period, turning-on time of the first switch is less than turning-on time of the third switch, turning-on time of the fourth switch is less than turning-on time of the second switch, and the turning-on time of the second switch overlaps with the turning-on time of the third switch in at least a third time period; and adjusting the third time period to reduce the voltage difference between the first capacitor and the second capacitor.

7. A DC/DC converter, comprising:

a first capacitor, having a first end coupled to a first node and a second end coupled to a second node;

a second capacitor, having a first end coupled to the first node and a second end coupled to a third node;

a five-port network, having a first end, a second end, a third end, a fourth end, and a fifth end respectively coupled to the first node, the second node, the third node, a fourth node, and a fifth node;

a transformer, having a primary winding electrically connected to the fourth node and the fifth node;

a secondary side circuit, electrically connected to a secondary winding of the transformer; and a processor, coupled to the five-port network and the secondary side circuit and configured to control, when a load is less than a preset value, switching states of multiple switches in the secondary side circuit, causing the transformer to be short-circuited for at least a first time period during a phase of stopping energy transmission; and control switching states of multiple switches in the five-port network during the first time period, causing current to flow from the five-port network to the first node or flow from the first node to the five-port network, so as to reduce a voltage difference between the first capacitor and the second capacitor, wherein the five-port network comprises:

a first bridge arm, coupled between the first node and the second node, comprising a first switch and a second switch connected in series; and a second bridge arm, coupled between the first node and the third node, comprising a third switch and a fourth switch connected in series, wherein the processor is configured to:

control in such a manner during the first time period that the first switch and the second switch are in complementary conduction, the third switch and the fourth switch are in complementary conduction, a first preset phase exists between turning-on time of the first switch and turning-on time of the fourth switch, and the first preset phase exists between turning-on time of the second switch and turning-on time of the third switch; and adjust the first preset phase to reduce the voltage difference between the first capacitor and the second capacitor.

8. The DC/DC converter according to claim 7, wherein the secondary circuit comprises:
a fourth bridge arm, comprising a fifth switch and a sixth switch coupled to a sixth node; and
a fifth bridge arm, comprising a seventh switch and an eighth switch coupled to a seventh node;
wherein the fifth switch is coupled to the seventh switch, the sixth switch is coupled to the eighth switch, and the sixth node and the seventh node are electrically connected to the secondary winding of the transformer;
wherein the processor is configured to:
simultaneously control the fifth switch and the seventh switch to be turned on and the sixth switch and the eighth switch to be turned off during the first time period; or
simultaneously control the sixth switch and the eighth switch to be turned on and the fifth switch and the seventh switch to be turned off during the first time period.

9. The DC/DC converter according to claim 7, wherein the secondary side circuit comprises:
a fifth switch, electrically connected to a first end of the secondary winding of the transformer through a sixth node; and
a sixth switch, coupled to the fifth switch and electrically connected to a second end of the secondary winding of the transformer through a seventh node;
wherein the processor is configured to simultaneously control the fifth switch and the sixth switch to be turned on during the first time period.

10. The DC/DC converter according to claim 7, wherein the processor is configured to control, when the load is less than the preset value, the DC/DC converter to operate in a burst mode, and wherein the first time period is within a burst period.

11. The DC/DC converter according to claim 7, wherein a preceding stage of the DC/DC converter comprises an AC/DC converter, the AC/DC converter being coupled to the first node, the second node, and the third node.

12. The DC/DC converter according to claim 7, wherein the DC/DC converter is a bidirectional conversion circuit.

13. A DC/DC converter, comprising:
a first capacitor, having a first end coupled to a first node and a second end coupled to a second node;
a second capacitor, having a first end coupled to the first node and a second end coupled to a third node;
a five-port network, having a first end, a second end, a third end, a fourth end, and a fifth end respectively coupled to the first node, the second node, the third node, a fourth node, and a fifth node;
a transformer, having a primary winding electrically connected to the fourth node and the fifth node;
a secondary side circuit, electrically connected to a secondary winding of the transformer; and
a processor, coupled to the five-port network and the secondary side circuit and configured to control, when a load is less than a preset value, switching states of multiple switches in the secondary side circuit, causing the transformer to be short-circuited for at least a first time period during a phase of stopping energy transmission; and control switching states of multiple switches in the five-port network during the first time period, causing current to flow from the five-port network to the first node or flow from the first node to the five-port network, so as to reduce a voltage difference between the first capacitor and the second capacitor,
wherein the five-port network comprises:
a first bridge arm, coupled between the first node and the second node, comprising a first switch and a second switch connected in series; and
a second bridge arm, coupled between the first node and the third node, comprising a third switch and a fourth switch connected in series,
wherein the processor is configured to:
control in such a manner during the first time period that the first switch and the second switch are in complementary conduction, the third switch and the fourth switch are in complementary conduction, and in a switching period, turning-on time of the first switch is greater than turning-on time of the second switch, turning-on time of the third switch is greater than turning-on time of the fourth switch, and the turning-on time of the first switch overlaps with the turning-on time of the third switch in at least a second time period, or in the switching period, the turning-on time of the first switch is less than the turning-on time of the second switch, the turning-on time of the third switch is less than the turning-on time of the fourth switch, and the turning-on time of the second switch overlaps with the turning-on time of the fourth switch in at least the second time period; and
adjust the second time period to reduce the voltage difference between the first capacitor and the second capacitor.

14. A DC/DC converter, comprising:
a first capacitor, having a first end coupled to a first node and a second end coupled to a second node;
a second capacitor, having a first end coupled to the first node and a second end coupled to a third node;
a five-port network, having a first end, a second end, a third end, a fourth end, and a fifth end respectively coupled to the first node, the second node, the third node, a fourth node, and a fifth node;
a transformer, having a primary winding electrically connected to the fourth node and the fifth node;
a secondary side circuit, electrically connected to a secondary winding of the transformer; and
a processor, coupled to the five-port network and the secondary side circuit and configured to control, when a load is less than a preset value, switching states of multiple switches in the secondary side circuit, causing the transformer to be short-circuited for at least a first time period during a phase of stopping energy transmission; and control switching states of multiple switches in the five-port network during the first time period, causing current to flow from the five-port network to the first node or flow from the first node to the five-port network, so as to reduce a voltage difference between the first capacitor and the second capacitor,
wherein the five-port network comprises:
a first bridge arm, coupled between the second node and the fourth node, comprising a first switch and a second switch coupled to an eighth node;
a second bridge arm, coupled between the third node and the fourth node, comprising a third switch and a fourth switch coupled to a ninth node; and
a third bridge arm, coupled between the eighth node and the ninth node, comprising a first diode and a second diode coupled to the fifth node;
and wherein the fifth node is coupled to the first node,
wherein the processor is configured to:

control in such a manner that the first switch and the third switch are in complementary conduction, the second switch and the fourth switch are in complementary conduction, and in a switching period, turning-on time of the first switch is less than turning-on time of the third switch, turning-on time of the fourth switch is less than turning-on time of the second switch, and the turning-on time of the second switch overlaps with the turning-on time of the third switch in at least a third time period; and
adjust the third time period to reduce the voltage difference between the first capacitor and the second capacitor.

\* \* \* \* \*